(No Model.)
I. H. FARNHAM.
RAILWAY TRACK SWEEPER.
No. 422,926. Patented Mar. 11, 1890.
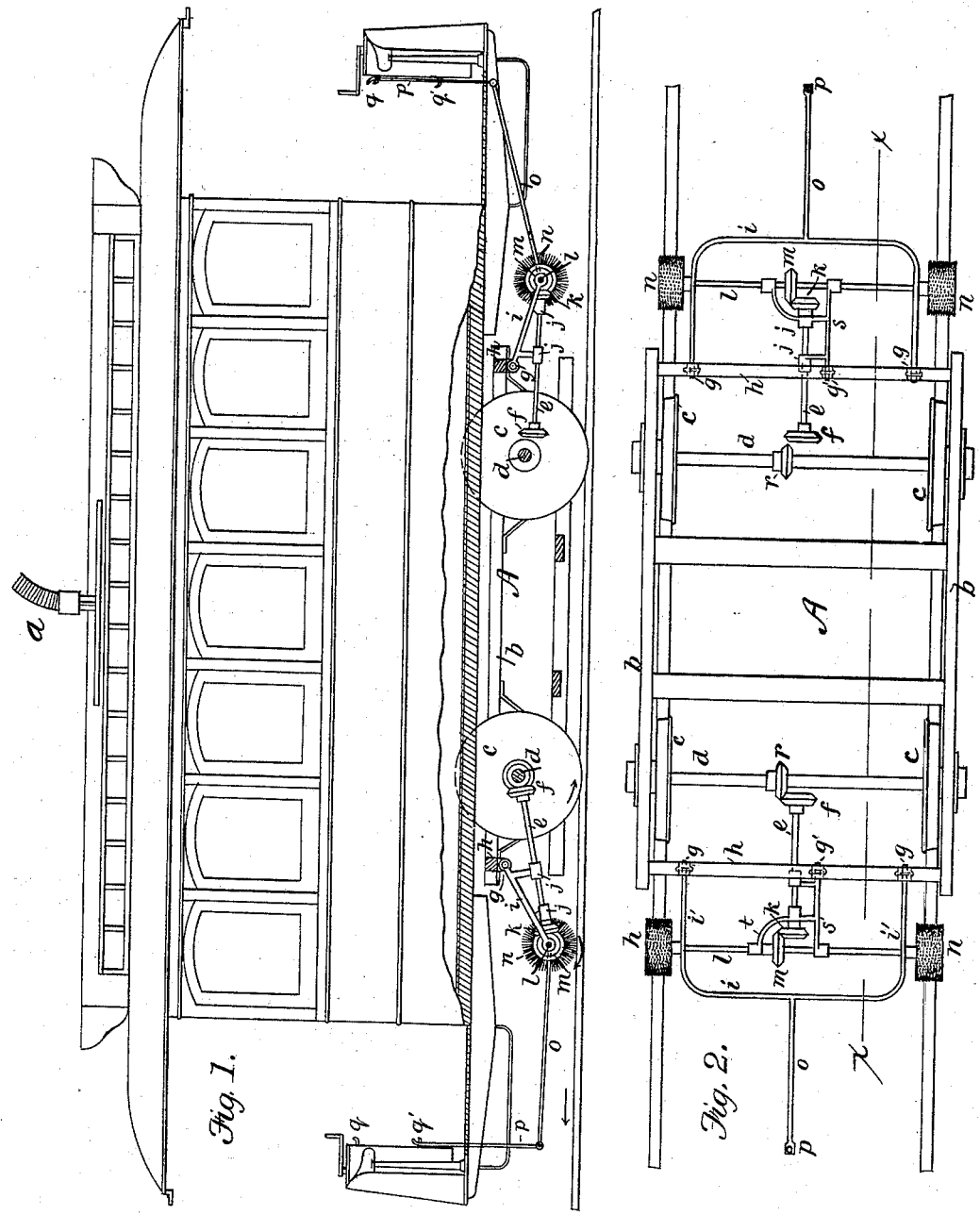
Witnesses:
Frank C. Lockwood
J. H. Martin
Inventor:
Isaiah H. Farnham
by G. Willis Pierce
Attorney

UNITED STATES PATENT OFFICE.

ISAIAH H. FARNHAM, OF WELLESLEY, ASSIGNOR OF TWO-THIRDS TO GEO. WILLIS PIERCE, OF BOSTON, AND ALBERT P. SAWYER, OF NEWBURYPORT, MASSACHUSETTS.

RAILWAY-TRACK SWEEPER.

SPECIFICATION forming part of Letters Patent No. 422,926, dated March 11, 1890.

Application filed December 19, 1889. Serial No. 334,326. (No model.)

*To all whom it may concern:*

Be it known that I, ISAIAH H. FARNHAM, residing at Wellesley, in the county of Norfolk and State of Massachusetts, have invented certain Improvements in Railway-Track Sweepers, of which the following is a specification.

This invention relates to railway-track cleaners or sweepers, and has for its object to provide a sweeping apparatus which shall be operated by the axles of the car-wheels when they are in motion.

The invention has for its object to provide a sweeping apparatus which is adjustably supported and suspended under the body of a railway-car, and which is operated from the platform of the car, and while applicable to any railway-car is especially adapted to street-cars propelled by motors actuated by electricity, in which it is desirable to maintain the traction of the car upon the rails at the maximum. In such railways it is absolutely necessary that the rails be kept clear and free from snow, mud, or accumulations of any kind which would interfere with the car-wheels making good contact with the rails, and thereby prevent the traction necessary to utilize whole power of the motor in propelling the car.

The invention consists in the improvements hereinafter described and claimed, comprising circular brushes arranged in advance of the car-wheels, to be revolved by any suitable means from the axle of the wheels when they are in motion, means whereby the brushes can be lowered to or raised from the rails from the car-platform, and when so lowered are automatically thrown out of gear, so that the said brushes will be at rest and not revolve.

In carrying out the invention, for the purposes of this specification a preferred means will now be described.

Similar apparatus is provided at each end of the car, consisting of circular brushes placed in advance of the wheels and secured to the ends of a shaft, which is journaled in a frame. One end of the frame is pivoted to the wheel truck or bogie. The other end is adjustably suspended by suitable means from the platform of the car, so that the driver or "motorneer" can lower the brushes to the rails or raise them therefrom. The circular brushes are rotated when the car is in motion by means of connecting mechanism from the wheel-axle, and rotate to sweep any obstruction upon the rails in the direction in which the car is traveling. I also provide means whereby when the brushes are raised from the track the connecting mechanism is automatically thrown out of gear with the wheel-axle, and when the brushes are lowered to the rails or track the said connecting mechanism is automatically thrown into gear with the said wheel-axle and the brushes caused to revolve.

In the accompanying drawings, Figure 1 is a side elevation of a street-railway car, and Fig. 2 is a plan or top view of the wheel truck or bogie. For convenience of illustration, in Fig. 1 the side of the car is shown as broken away, and the wheel-truck as a sectional view on line $x$ $x$ of Fig. 2.

The car is shown as arranged for a single overhead trolley-wire system employing the rails for the return-circuit.

The trolley-mast $a$ is shown as broken away.

The wheel-truck A is represented, for the sake of clearness, with the motor, its gearing and the car-brake apparatus removed.

As there are similar sweeping appliances at each end of the car, a description of one will suffice. The circular brushes $n$ $n$ are secured to the ends of the shaft $l$, which is journaled to the frame $i$, the ends or arms $i'$ $i'$ whereof are pivoted to the cross-bar $h$ of the car-truck. Near the middle of the shaft $l$ is secured a bevel-gear $m$, which meshes with the bevel-gear $k$ on the end of shaft $e$. The said shaft is supported by the branching arm $s$, which is pivoted at one end to the bar $h$. The opposite ends of the arm terminate in hubs which encircle the shaft $l$. At the inner end of the shaft $e$ is a bevel-gear $f$, which, when the brushes are lowered to sweep the rails, meshes with the bevel-gear $r$, secured to the wheel-axle $d$. A rod $o$ projects from the frame $i$ toward the forward part of the car-platform, at the extremity of which is pivoted a bar or chain $p$, which passes through the floor of the car-platform and is secured to the hooks $q$ or $q'$ on the car-dasher, or in any suitable way.

In Fig. 1, in the sweeping apparatus to the right, the brushes are shown as raised from the rails and with the bevel-gear $f$ out of gear with the bevel-gear $r$ on the wheel-axle, and when in this position the brushes are at rest, while in the apparatus to the left the brushes are shown as lowered and resting upon the rails, and the bevel-gear $f$ meshing with the bevel-gear $r$ on the wheel-axle in a position to receive motion from the said axle when the car is in motion, the said brushes being in position to sweep obstructions from the rails and throw the same in the direction in which the car is traveling, as shown by the curved arrow. The bevel-gear $r$, meshing with the gear $f$, rotates the shaft $e$ and the bevel-gear $k$, which in turn rotates the gear $m$ with the shaft $l$ and the brushes $n$ $n$.

The bar $p$ is provided with a suitable means for adjusting the brushes at the proper distance from the rails, and also to sustain the weight of the apparatus when so adjusted or lowered and also when raised from the track. The hooks $q$ $q'$ are shown for that purpose. A perforation in the upper part of the bar allows the same to be hung upon the hooks. The upper end of the bar is bent over to form a handle by which the apparatus is moved up or down.

The advantages of automatically connecting and disconnecting the sweeping apparatus from the wheel-axle are apparent. When the car is traveling in one direction, the apparatus is raised out of the way at the rear end of the car and the power required to rotate the brushes is saved, and the unnecessary wear of the parts which would ensue from being continually in motion is prevented.

I claim—

1. The combination, with a wheel-truck, of a frame pivoted to the truck, means for raising and lowering said frame, a rotary brush mounted in bearings on the frame and adapted to be raised and lowered with said frame, and connections between the brush-shaft and an axle of the car which are made operative by the depression of the frame and brush to transmit motion from the axle to the brush, and made inoperative by the elevation of the frame and brush, whereby the brush is operatively engaged with the axle when depressed and disengaged therefrom when raised, as set forth.

2. The combination, with a wheel-truck, of a frame pivoted at one end to the truck, means for raising and lowering said frame, a rotary brush mounted in bearings at the swinging end of the frame, a shaft $e$, journaled in bearings on said frame substantially at right angles with the brush-shaft and geared to the latter, and a gear on the adjacent car-axle arranged to engage a gear on said shaft $e$, the frame being arranged to connect the shaft $e$ with the axle-gear by a downward movement and to disconnect said shaft and gear by an upward movement, as set forth.

3. The combination, with a wheel-truck having an axle $d$ provided with a bevel-gear $r$, of a frame pivoted to said truck at one end at a point which is higher than the axle, means for raising and depressing said frame, a rotary brush journaled in the swinging end of the frame and having a bevel-gear $m$ on its shaft, and a shaft $e$, journaled in bearings in the frame substantially at right angles with the brush-shaft, and provided at one end with a bevel-gear $k$, meshing continuously with the gear $m$ on the brush-shaft, and at the other end with a bevel-gear $f$, which is engaged with the axle-gear $r$ by a downward movement of the frame and separated from said gear by an upward movement of the frame, as set forth.

In testimony whereof I have signed my name to this specification, in the presence of two subscribing witnesses, this 16th day of December, 1889.

ISAIAH H. FARNHAM.

Witnesses:
FRANK C. LOCKWOOD,
GEO. WILLIS PIERCE.